United States Patent
Zimmer

(10) Patent No.: US 8,997,537 B2
(45) Date of Patent: Apr. 7, 2015

(54) OPENING APPARATUS FOR A DOOR THAT HAS AN OUTER PANEL, A MOTOR VEHICLE AND A MOTOR VEHICLE DOOR WITH SUCH AN OPENING APPARATUS

(71) Applicant: Dr. Ing. h.c. F. Porsche Aktiengesellschaft, Stuttgart (DE)

(72) Inventor: Jens Zimmer, Wiernsheim-Iptingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/037,700

(22) Filed: Sep. 26, 2013

(65) Prior Publication Data
US 2014/0096576 A1    Apr. 10, 2014

(30) Foreign Application Priority Data
Oct. 9, 2012  (DE) .................. 10 2012 109 557

(51) Int. Cl.
| | | |
|---|---|---|
| B60R 25/02 | (2013.01) | |
| E05B 3/00 | (2006.01) | |
| E05B 83/36 | (2014.01) | |
| E05B 85/10 | (2014.01) | |
| E05B 81/88 | (2014.01) | |
| B60J 5/04 | (2006.01) | |

(52) U.S. Cl.
CPC ............ *E05B 83/36* (2013.01); *E05B 85/10* (2013.01); *E05B 81/88* (2013.01); *B60J 5/0415* (2013.01)

(58) Field of Classification Search
USPC .......... 70/207, 208, 210, 215, 224, 370, 371; 296/146.1, 146.5; 49/460, 502, 503
See application file for complete search history.

(56) References Cited

U.S. PATENT DOCUMENTS

| | | | |
|---|---|---|---|
| 4,956,943 A * | 9/1990 | Yamada et al. ................. 49/503 |
| 6,470,719 B1 * | 10/2002 | Franz et al. ..................... 70/208 |
| 6,913,309 B2 * | 7/2005 | Mikolai et al. ............. 296/146.1 |
| 6,964,440 B2 * | 11/2005 | Lebsack et al. ............. 292/336.3 |
| 7,832,240 B2 * | 11/2010 | Najima ........................... 70/208 |
| 7,837,243 B2 * | 11/2010 | Stiglich ...................... 296/146.1 |
| 8,146,393 B2 * | 4/2012 | Katagiri et al. ................. 70/208 |
| 8,322,172 B2 * | 12/2012 | Mizumoto ...................... 70/240 |
| 8,359,889 B2 * | 1/2013 | Katagiri et al. ................. 70/215 |
| 8,485,573 B2 * | 7/2013 | Gouhara et al. ............ 292/336.3 |
| 2004/0177478 A1 * | 9/2004 | Louvel ............................ 16/430 |
| 2009/0039671 A1 * | 2/2009 | Thomas et al. ............ 292/336.3 |

(Continued)

FOREIGN PATENT DOCUMENTS

| | | |
|---|---|---|
| DE | 39 39 768 | 6/1991 |
| DE | 298 04 105 | 8/1999 |
| DE | 699 15 918 | 2/2005 |

(Continued)

OTHER PUBLICATIONS

German Search Report of Oct. 9, 2012.

*Primary Examiner* — Christopher Boswell
(74) *Attorney, Agent, or Firm* — Gerald H. Hespos; Michael J. Porco; Matthew T. Hespos

(57) ABSTRACT

A door (200) of a motor vehicle has an outer panel (100) and an opening apparatus. The opening apparatus has a door handle (30) and a door lock (20) with a lock barrel (10). The lock barrel (10) and the door handle (30) are arranged completely on the inner side of the outer panel (100) of the door (200).

15 Claims, 4 Drawing Sheets

(56) References Cited

U.S. PATENT DOCUMENTS

2009/0205383 A1* 8/2009 Katagiri et al. ............ 70/237
2013/0170241 A1* 7/2013 Lesueur et al. ............. 70/91

FOREIGN PATENT DOCUMENTS

| | | |
|---|---|---|
| DE | 10 2007 042 612 | 3/2009 |
| DE | 10 2008 012 032 | 9/2009 |
| JP | 63-66318 | 5/1988 |
| JP | 63-151666 | 10/1988 |
| JP | 3-129669 | 12/1991 |
| JP | 10-184146 | 7/1998 |
| JP | 2005-220664 | 8/2005 |
| JP | 2007-247223 | 9/2007 |
| JP | 2009-197405 | 9/2009 |

* cited by examiner

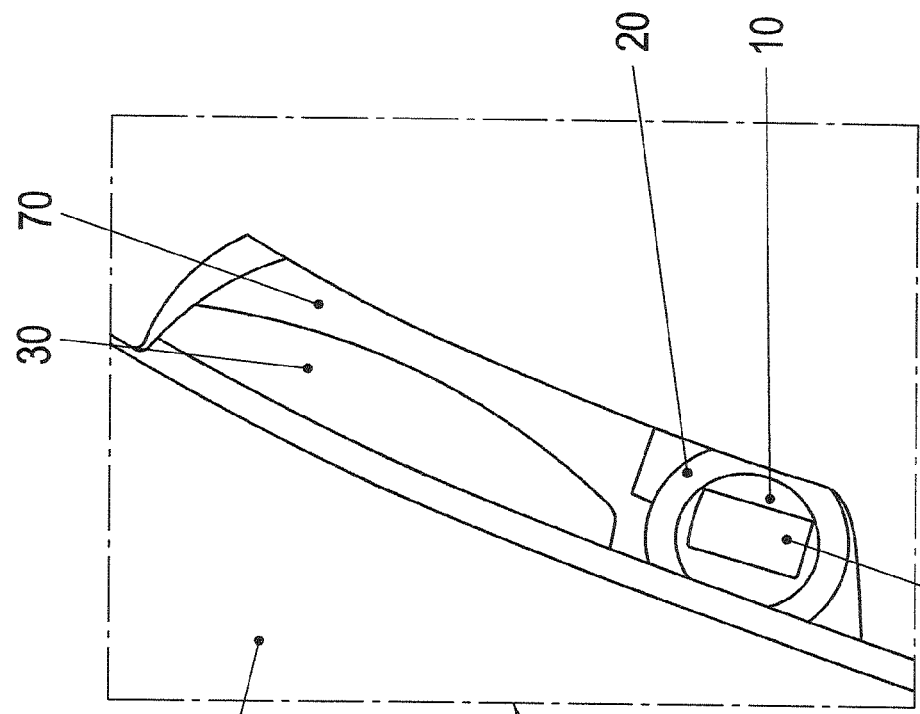
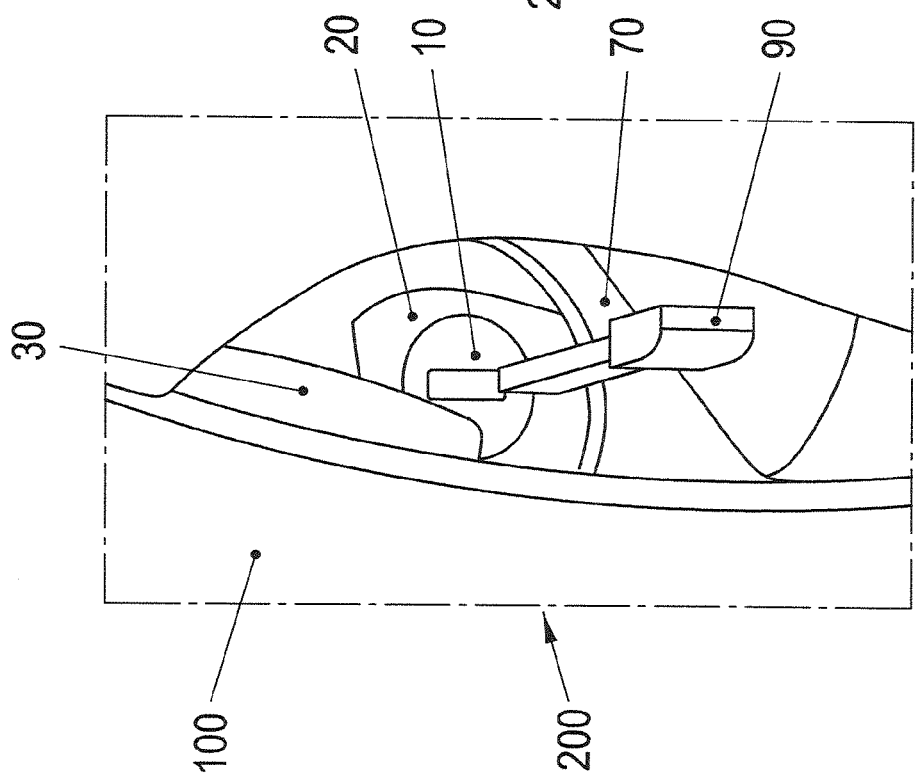

OPENING APPARATUS FOR A DOOR THAT HAS AN OUTER PANEL, A MOTOR VEHICLE AND A MOTOR VEHICLE DOOR WITH SUCH AN OPENING APPARATUS

CROSS REFERENCE TO RELATED APPLICATION

This application claims priority under 35 USC 119 to German Patent Appl. No. 10 2012 109 557.4 filed on Oct. 9, 2012, the entire disclosure of which is incorporated herein by reference.

BACKGROUND

1. Field of the Invention

The invention relates to an opening apparatus of a door that has an outer panel. The invention also relates to a motor vehicle and to a motor vehicle door with such an opening apparatus.

2. Description of the Related Art

Radio remote controls that open or lock the doors of a motor vehicle have been available for many years. However, the doors must be capable of being opened and locked in the case of loss or theft of the radio remote control, or if the energy source of the radio remote control is exhausted. To this end, a lock barrel of the door lock usually is arranged in a recessed indentation of the door and can be actuated by a conventional key. Furthermore, the door handle and the recessed indentation should have minimal impact on the contour of the door for aerodynamic and visual reasons.

DE 298 04 105 U1 discloses a door opening apparatus where a motor pivots a door handle out of the recessed indentation of the motor vehicle door. The lock barrel of the door lock lies in an undergripping zone of an inaccessible hidden position and is accessible only in the pivoted-out position of the door handle.

An object of the invention is to provide an opening apparatus of a motor vehicle door that has an outer panel. The outer panel has a recessed indentation that is arranged in an aerodynamically and visually advantageous manner, while the lock barrel of the door lock and the door handle are accessible in a simple and reliable manner.

SUMMARY OF THE INVENTION

The invention relates to a door opening apparatus of a motor vehicle door that has an outer panel. The door opening apparatus has a door handle and a door lock with a lock barrel. Both the lock barrel and the door handle are arranged completely on the inner side of the outer panel of the door. The inner-side arrangement of the lock barrel and the door handle eliminates eddying of air that glides over the components and improves the aerodynamics of the motor vehicle in the region of the door.

The lock barrel and the door handle are covered by the outer panel of the door in a frontal viewing direction of the outer panel. Thus, the contour of the outer panel of the door of the motor vehicle is not interrupted by the lock barrel and the door handle, and the contour is visually smoother. The covered arrangement of the lock barrel and the door handle greatly restrict possibilities for manipulating the lock barrel and make violent opening of the door substantially more difficult. Therefore, the rear-side arrangement of the lock barrel advantageously helps to prevent theft of the motor vehicle.

The longitudinal axis of the lock barrel is inclined by a predefined angle with respect to the longitudinal extent of the door. The angle can be between 10° and 45° and, in a further preferred embodiment, the angle can be between 15° and 30°. The inclination of the longitudinal axis of the lock barrel preferably points in the direction of the underside of the motor vehicle. The inclination of the longitudinal axis of the lock barrel improves the accessibility of the emergency key to the lock barrel for the driver.

The lock barrel preferably is inclined by a predefined angle with respect to the transverse direction of the motor vehicle. The angle can be between 20° and 80° and, in a further preferred embodiment, the angle can be between 35° and 70°. The inclination of the longitudinal axis of the lock barrel with respect to the transverse direction of the motor vehicle preferably points in the direction of the interior of the motor vehicle. The inclination of the lock barrel with respect to the transverse direction of the motor vehicle likewise improves accessibility of the emergency key to the lock barrel for the driver and reduces the required space for inserting the emergency key into the lock barrel.

The door handle and the lock barrel preferably are arranged in the region of the free end of the door. This arrangement of the two components in the region of the free end of the door allows novel concepts for a door handle of a motor vehicle and makes allowances for the amended possibilities in this region of the door.

The door handle preferably has a handle body that can be pivoted about a pivot axis. The handle body preferably has a longitudinal axis that extends substantially transverse to the longitudinal direction of the door. Thus, actuation of the door handle takes place by means of several fingers that perform the movement of a closing hand. As a result, the operating comfort for the driver of the motor vehicle is increased during opening of the door, since the hand and the fingers are situated in an ergonomically favorable position during this operation.

The pivot axis of the handle body preferably is different than the longitudinal direction of the door. This arrangement of the handle body and its pivot axis is characteristic of the configuration of the integrated door handle and results in the novel way of actuating the door handle.

The pivot axis of the handle body preferably is inclined by a predefined angle with respect to the vertical. The angle of the pivot axis of the handle body with respect to the vertical can be between 15° and 60° and, in one preferred embodiment, the angle can be between 25° and 50°. The inclination of the pivot axis of the handle body with respect to the vertical preferably points in the direction of the interior of the motor vehicle. The selection of the angle of the pivot axis of the handle body is determined critically by the anatomical features of the human hand in conjunction with the desired installation position of the door handle.

The lock barrel and the door handle can be arranged on a driver's and/or passenger's door of the motor vehicle. The abovementioned arrangement of the lock barrel and the door handle contributes substantially to smoothing the visual appearance of the side region of the motor vehicle, since this region is particularly important for the perception of the customers. Furthermore, the inner-lying arrangement of the lock barrel and the door handle in turn contributes substantially to the aerodynamic improvement of the door region of the motor vehicle. The present door opening apparatus can likewise be used on the rear doors of the motor vehicle.

The door handle can be arranged in a housing that is dimensioned so that the housing deforms as little as possible in the case of an accident. A housing of this type advantageously permits the use of the integrated door handle, since it ensures the legally required continued closure of the door in the case of a side impact despite the deformation, caused in the process, of the door construction.

A recessed indentation can be provided on the motor vehicle outside the door and opposite the door lock. The present inner-side arrangement of the lock barrel and the door handle desirably enables the recessed indentation to be formed completely outside the door, such as in the region of the B-pillar of the motor vehicle. This results in the above-mentioned advantages with regard to the aerodynamics of the door and the visual smoothing of the door, since said door now appears as a continuous, consistent structure without being interrupted by the recessed indentation, the door handle and the door lock. Furthermore, the production of the outer panel of the door is simplified in an advantageous way, since forming the recessed indentation is dispensed with. In addition, the production of the associated set of forming dies is simplified, since the forming step for the recessed indentation is dispensed with for the outer panel of the door. A recessed indentation still is required, but can be on a component for the region of the B-pillar, and has simplified shape in comparison with the previously known shape of a recessed indentation. It is also being possible as a result to produce the recessed indentation in a correspondingly more simple and more reliable way by means of a forming process.

The door lock can be coupled to a bevel gear mechanism that transmits the rotational movement of the lock barrel to a Bowden cable that participates in the actuation of the locking mechanism for the lock of the door.

The invention also relates to a door of a motor vehicle with the above-described door opening apparatus and a motor vehicle with such a door opening apparatus.

In the following text, the invention will be explained in greater detail using exemplary embodiments with reference to the appended diagrammatic figures.

BRIEF DESCRIPTION OF THE DRAWINGS

FIG. 4 is a partial view of the insertion of the emergency key into the lock barrel of the door of the motor vehicle with the door opening apparatus of FIG. 2.

FIG. 5 is a partial view of the inserted emergency key in the lock barrel of a door of the motor vehicle with the door opening apparatus of FIG. 4.

DETAILED DESCRIPTION OF THE PREFERRED EMBODIMENTS

Figure 1:
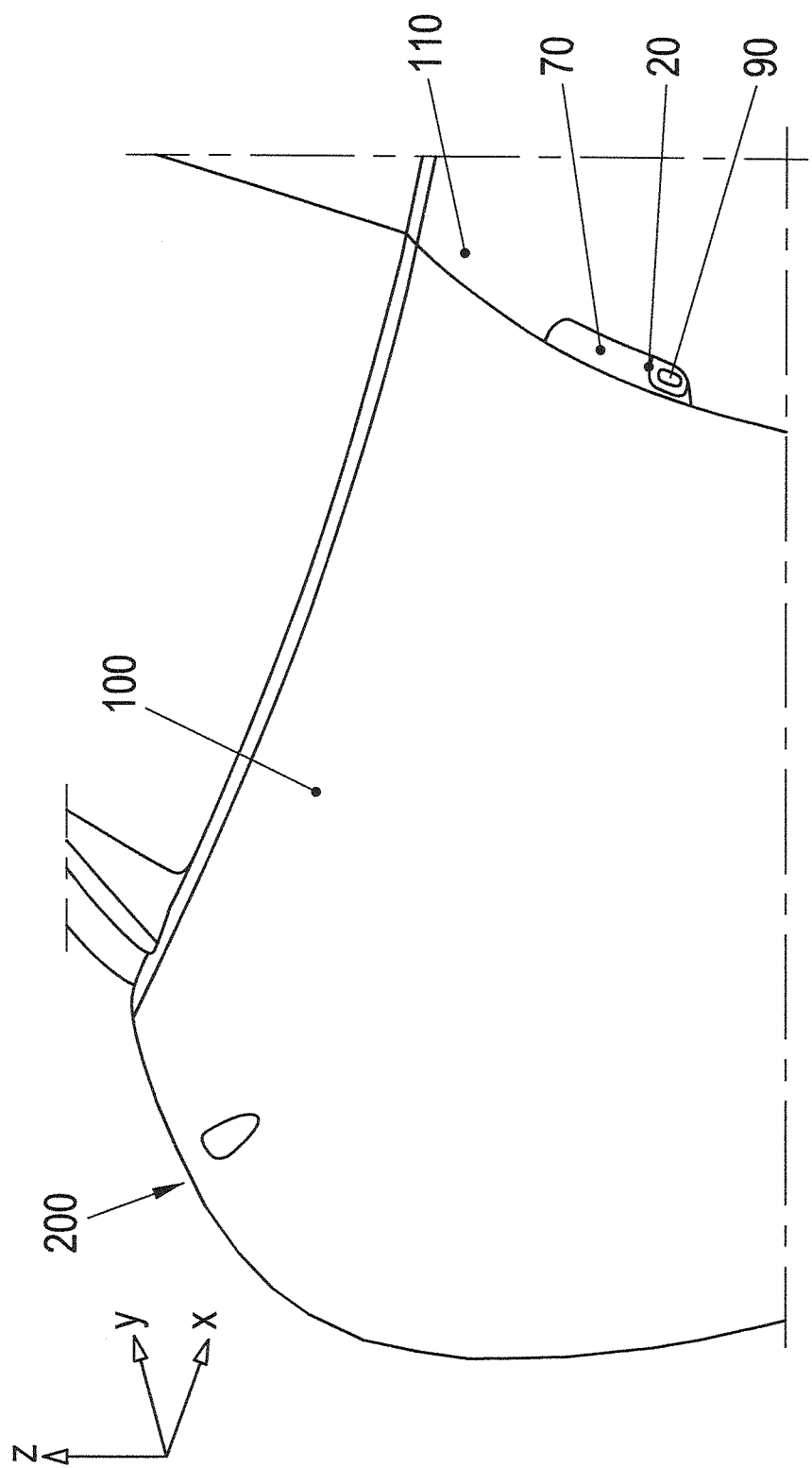
FIG. 1 is a perspective view from the side of a door of a motor vehicle with a door opening apparatus according to one embodiment of the invention.

FIG. 1 is a perspective view from the side of a door 200 of a motor vehicle (not shown) with a door opening apparatus according to one exemplary embodiment of the invention. The door 200 has a hinged end at the left in FIG. 1 and a free end at the right in FIG. 1. The hinged end and the free end are spaced apart along the x direction in FIG. 1, which is the longitudinal direction of the motor vehicle and is referred to herein as the longitudinal direction of the door 200. The vertical or z direction in FIG. 1 is referred to herein as the transverse direction of the door 200. The y direction in Fig. is the transverse direction of the motor vehicle. The outer side of the door 200 is formed by an outer panel 100 that has a contoured shape in sections in the transverse direction of the door 200, particularly in the region of its upper end. The door 200 has a door lock 20 on the inner side of the outer panel 100. The door lock 20 is in the region of the free longitudinal end of the door 200 and the free longitudinal end of the outer panel 100. Therefore, if the door 200 is viewed along the y direction in FIG. 1, the door lock 20, which lies on the inside, and a door handle (not shown), which likewise lies on the inside, are covered by the outer panel 100. The door lock 20 and the door handle preferably are arranged on at least one of a driver's door and a passenger's door of the motor vehicle, but also can be used in each case on rear doors (not shown) of the motor vehicle.

The closed door 200 adjoins a shaped sheet-metal part 110 of the motor vehicle that has a recessed indentation 70 in an end region adjacent to the free longitudinal end of the door. The recessed indentation 70 defines an access space for inserting an emergency key 90 into the door lock 20. The door 200 therefore does not have a recessed indentation on its outer side. As a result, the visual appearance of the door 200 is smoothed with contours that continue in the longitudinal and transverse directions of the door 200 and the aerodynamic properties of the door 200 are improved.

Figure 2:
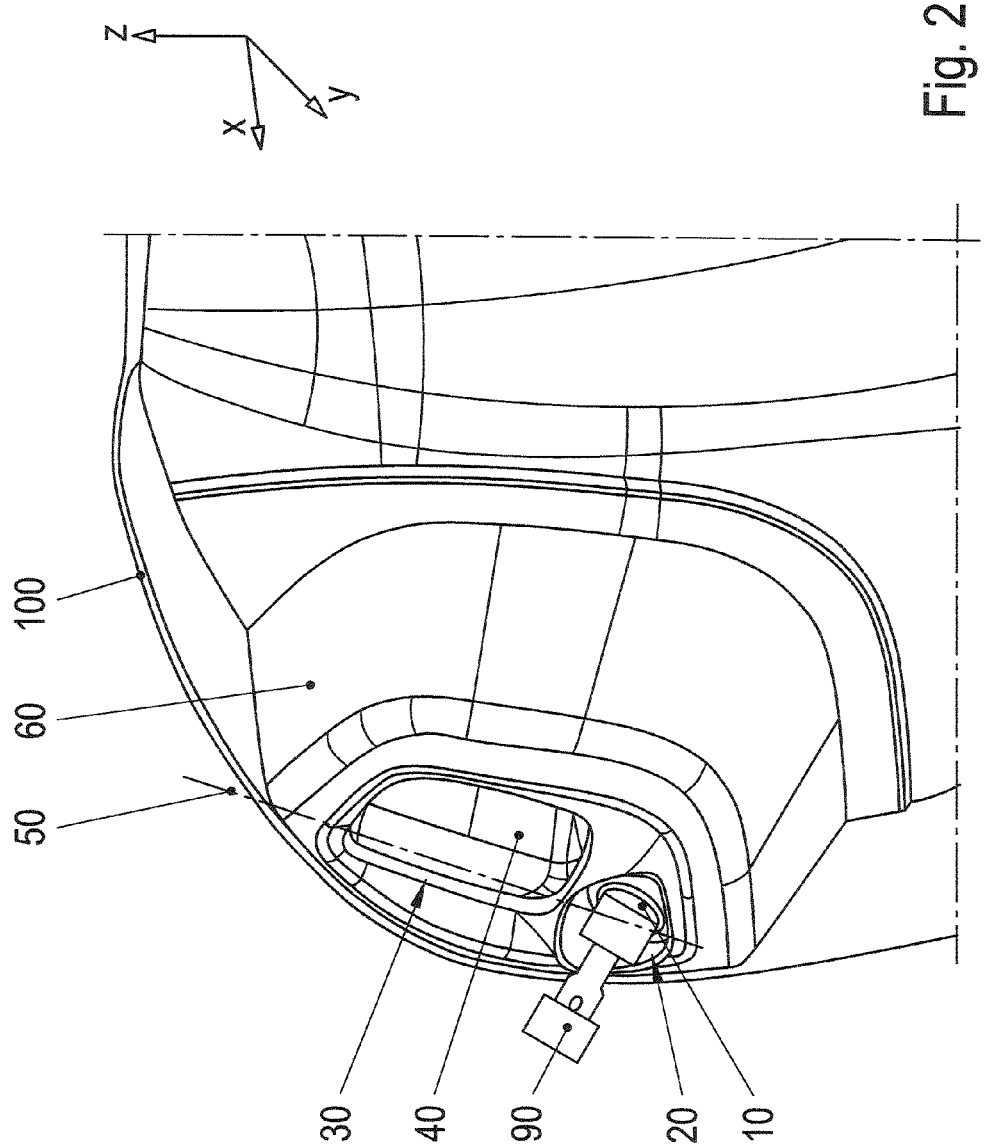
FIG. 2 is a perspective view from behind of the door of a motor vehicle with the door opening apparatus of FIG. 1.

FIG. 2 is a perspective view from the rear of the free end of the door 200 of the motor vehicle with the door opening apparatus of FIG. 1. A door lock 20 with a lock barrel 10 adjoins a region of the outer panel 100 of the door 200. An emergency key 90 is inserted partially into the lock barrel 10 of the door lock 20.

The longitudinal axis of the lock barrel 10 is inclined by a predefined first angle with respect to the longitudinal or x direction of the door 200. The first angle can be between 10° and 45° and, in a preferred embodiment, is be between 15° and 30°. The first angle is inclined so that the longitudinal axis of the lock barrel 10 points in the direction of the underside of the motor vehicle. The lock barrel 10 also is inclined by a predefined second angle with respect to the transverse or y direction of the motor vehicle. The second angle can be between 20° and 80° and preferably is between 35° and 70°. The second angle is inclined so that the longitudinal axis of the lock barrel 10 with respect to the transverse direction of the motor vehicle points in the direction of the interior of the motor vehicle.

The door opening apparatus has a door handle 30 that is surrounded by a housing (not shown). The housing preferably is dimensioned to deform as little as possible in the case of an accident. The door handle 30 can be actuated via a handle body 40 that is a substantially flat rectangle. The longitudinal axis of the handle body 40 extends substantially transversely to the longitudinal direction of the door 200.

The handle body 40 can be pivoted about a pivot axis 50 that is arranged in the region of a transverse end of the handle body 40. The free end of the handle body 40 preferably pivots toward the outer panel 100 of the door 200 upon actuation of the door handle 30. The pivot axis of the handle body 40 preferably is different than the longitudinal direction of the door 200. Additionally, the pivot axis 50 of the handle body 40 is inclined by a predefined third angle with respect to the vertical. The third angle of the pivot axis 50 of the handle body 40 with respect to the vertical can be between 15° and 60° and preferably is between 25° and 50°. The inclination of the pivot axis 50 of the handle body 40 with respect to the vertical preferably points toward the interior of the motor vehicle. The selection of the angle of the pivot axis 50 of the handle body 40 is defined critically by the anatomical features of the human hand in conjunction with the desired installation position of the door handle 30.

The optical termination of the door opening apparatus is achieved substantially by a cover plate 60. The cover plate 60 covers essential regions of the lock barrel 10 and of the housing for the door handle 30. The cover plate 60 is in the region of the free longitudinal end of the door 200 and adjoins the outer panel 100 of the door 200.

Figure 3:
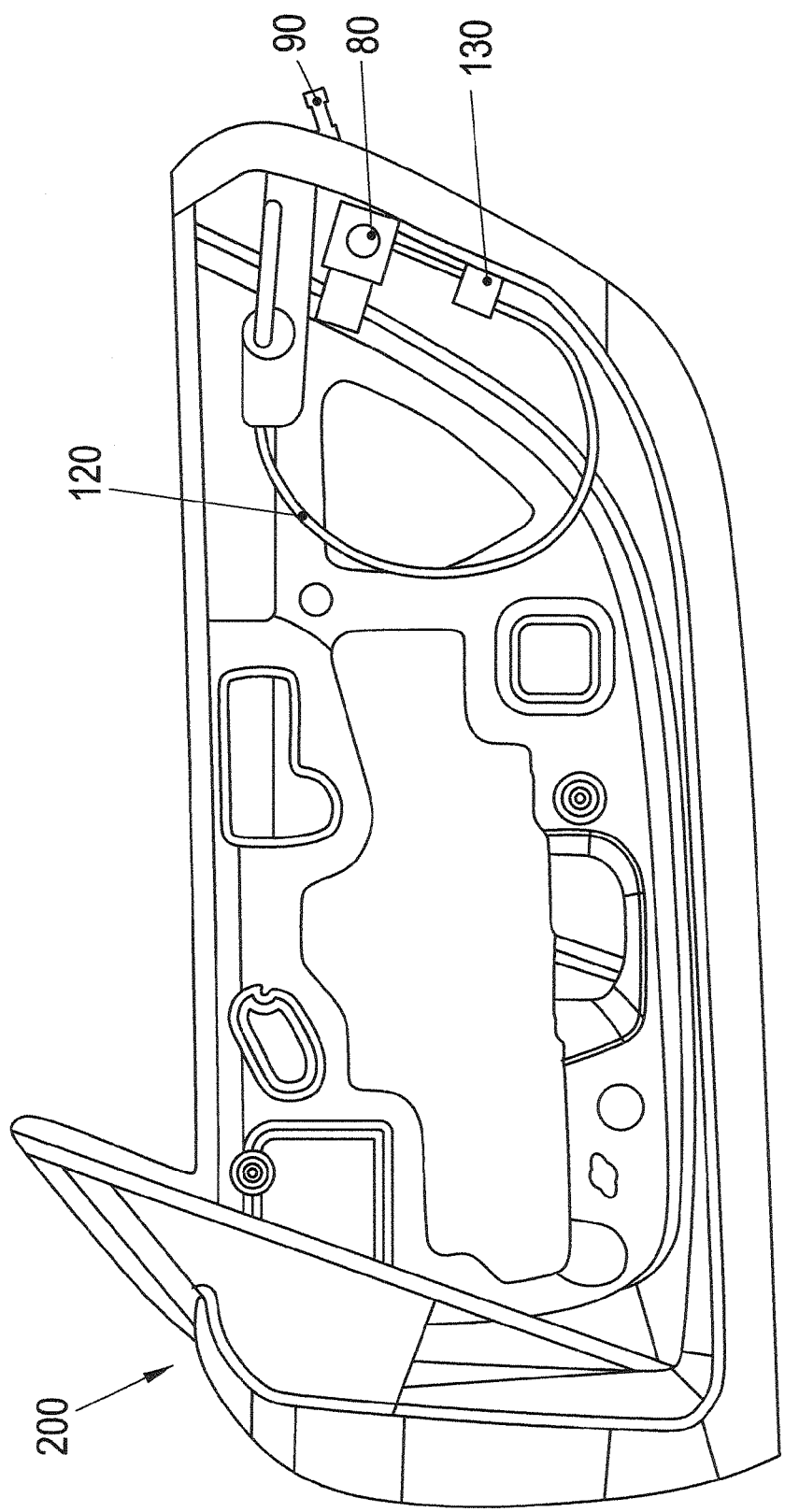
FIG. 3 is a rear view of the door of a motor vehicle with the door opening apparatus of FIG. 2, with the outer panel of the door and the trim elements of the door being removed.

FIG. 3 shows a rear view of the door 200 of the motor vehicle with the door opening apparatus of FIG. 2, with the outer panel and trim elements of the door 200 removed. An emergency key 90 is shown partially inserted into the lock barrel of the door opening apparatus. If the emergency key 90 is inserted completely into the lock barrel and the driver rotates the emergency key 90 in the actuating direction of the lock barrel, an actuating element (not shown) of the lock barrel performs a rotational movement. This release movement of the lock barrel then has to be transmitted mechanically in the direction of a locking mechanism 130 of the door 200. The locking mechanism 130 is arranged in the region of a free end of the door 200 and is spaced from the door opening apparatus. The locking mechanism 130 ensures that a closed door 200 remains closed and releases its locking action again only after renewed actuation of the lock barrel.

The lock barrel is coupled to a bevel gear mechanism 80 that receives the rotational movement of the actuating element of the lock barrel and outputs a rotational movement on an output side. The bevel gear mechanism 80 is connected to a Bowden cable 120. The Bowden cable 120 in turn is coupled to the locking mechanism 130 of the door 200 and ensures that the locking mechanism 130 is actuated.

FIGS. 4 and 5 show a partial view of the insertion of an emergency key 90 into the lock barrel 10 of the door 200 with the door opening apparatus of FIG. 2, and the inserted emergency key 90 in the lock barrel 10 of the door 200 of the motor vehicle with the door opening apparatus according to FIG. 4.

In the case of an emergency situation, an emergency key 90 is guided through a recess indentation 70 into a region of the door lock 20 of the motor vehicle, and subsequently is inserted completely into the lock barrel 10 of the door lock 20. The door lock 20 and the door handle 30 are arranged completely on the inner side of the outer panel 100 of the door 200. After this, the emergency key 90 is rotated in the actuating direction of the lock barrel 10. As a result, the above-described components of the locking mechanism (not shown) release the mechanical locking action of the door 200. In one preferred embodiment, the door handle 30 is an integrated door handle, in which the actuation of the door handle 30 takes place by means of several fingers that perform the movement of a closing hand. As a result, the operating comfort for the driver of the motor vehicle is increased during opening of the door 200, since the hand and the fingers are situated in an ergonomically favorable position during this operation. After the actuation of the door handle 30, the door 200 of the motor vehicle can then be opened.

Although the present invention has been described using preferred exemplary embodiments, it is not restricted thereto, but rather can be modified in a wide variety of ways. In particular, the above-described developments and exemplary embodiments can be combined with one another as desired. Furthermore, it is to be noted that "one/a" does not rule out a plurality.

What is claimed is:

1. A door opening apparatus of a motor vehicle, comprising:
   a door having a hinged end and a free end opposite the hinged end, the hinged end and the free end being spaced from one another along a longitudinal direction of the door, the door having an outer panel extending from the hinged end to the free end;
   a recessed indentation formed in a region of the motor vehicle adjacent the free end of the door;
   a door lock having a lock barrel and arranged in proximity to the free end of the door; and
   a door handle arranged in proximity to the free end of the door and being pivotable about a pivot axis that is not parallel to the longitudinal direction of the door;
   the lock barrel and the door handle being arranged completely on an inner side of the outer panel of the door and being accessible only via the recessed indentation in the region of the motor vehicle adjacent the free end of the door.

2. The door opening apparatus of claim 1, wherein both the lock barrel and the door handle are covered by the outer panel of the door in a frontal viewing direction of the outer panel of the door.

3. The door opening apparatus of claim 1, wherein the lock barrel has a longitudinal axis that is inclined by a predefined angle with respect to the longitudinal extent of the door.

4. The door opening apparatus of claim 3, wherein the lock barrel is inclined by a predefined angle with respect to a transverse direction of the motor vehicle.

5. The door opening apparatus of claim 1, wherein the door handle has a handle body that is pivotable about the pivot axis so that an end of the handle body spaced from the pivot axis is movable toward an inner surface of the outer panel of the door.

6. The door opening apparatus of claim 1, wherein the pivot axis of the handle body is inclined by a predefined angle with respect to the vertical.

7. The door opening apparatus of claim 1, wherein the lock barrel and the door handle are arranged on at least one of a driver's door and passenger's door of the motor vehicle.

8. The door opening apparatus of claim 1, wherein the door handle is arranged in a rigid housing that is substantially undeformable in case of an accident.

9. The door opening apparatus of claim 1, wherein a recessed indentation is provided on the motor vehicle outside the door and opposite the door lock.

10. The door opening apparatus of claim 1, wherein the door lock is coupled to a bevel gear mechanism.

11. A door of a motor vehicle with the door opening apparatus of claim 1.

12. A motor vehicle, comprising:
   a door having a hinged end and a free end opposite the hinged end, the hinged end and the free end being spaced from one another along a longitudinal direction of the door, the door having an outer panel extending from the hinged end to the free end;
   a recessed indentation formed in a region of the motor vehicle adjacent the free end of the door;
   a door lock having a lock barrel and arranged in proximity to the free end of the door; and
   a door handle arranged in proximity to the free end of the door and being pivotable about a pivot axis that is not parallel to the longitudinal direction of the door;
   the lock barrel and the door handle being arranged completely on an inner side of the outer panel of the door and being accessible only via the recessed indentation in the region of the motor vehicle adjacent the free end of the door.

13. The motor vehicle of claim 12, wherein the pivot axis of the handle body is inclined by a predefined angle with respect to the vertical.

14. The motor vehicle of claim 13, wherein the door handle has a handle body that is pivotable about the pivot axis so that an end of the handle body spaced from the pivot axis is movable toward an inner surface of the outer panel of the door.

15. The motor vehicle of claim 12, wherein the door handle has a handle body that is pivotable about the pivot axis so that an end of the handle body spaced from the pivot axis is movable toward an inner surface of the outer panel of the door.

* * * * *